United States Patent
Aviles et al.

(10) Patent No.: US 8,300,010 B2
(45) Date of Patent: *Oct. 30, 2012

(54) COMMUNICATIONS WITH A HAPTIC INTERFACE DEVICE FROM A HOST COMPUTER

(75) Inventors: Walter A Aviles, San Diego, CA (US); Thomas G Anderson, Albuquerque, NM (US); V Gerald Grafe, Corrales, NM (US)

(73) Assignee: Novint Technologies, Inc., Albuquerque, NM (US)

( * ) Notice: Subject to any disclaimer, the term of this patent is extended or adjusted under 35 U.S.C. 154(b) by 897 days.

This patent is subject to a terminal disclaimer.

(21) Appl. No.: 12/363,720

(22) Filed: Jan. 31, 2009

(65) Prior Publication Data

US 2009/0201247 A1 Aug. 13, 2009

Related U.S. Application Data

(63) Continuation of application No. 12/173,014, filed on Jul. 14, 2008, now Pat. No. 7,486,273.

(60) Provisional application No. 61/027,953, filed on Feb. 12, 2008.

(51) Int. Cl.
*G09G 5/00* (2006.01)
*G05B 13/02* (2006.01)
(52) U.S. Cl. .......................................... 345/156; 700/45
(58) Field of Classification Search .................. 345/156, 345/163; 700/45
See application file for complete search history.

(56) References Cited

U.S. PATENT DOCUMENTS

| | | | | |
|---|---|---|---|---|
| 5,956,484 | A * | 9/1999 | Rosenberg et al. | 709/203 |
| 6,160,489 | A * | 12/2000 | Perry et al. | 340/7.6 |
| 6,422,941 | B1 * | 7/2002 | Thorner et al. | 463/30 |
| 6,609,167 | B1 | 8/2003 | Bastiani et al. | |
| 7,636,080 | B2 * | 12/2009 | Rosenberg et al. | 345/156 |
| 7,746,320 | B2 * | 6/2010 | Hardwick et al. | 345/156 |
| 2002/0163498 | A1 | 11/2002 | Chang et al. | |
| 2003/0018403 | A1 | 1/2003 | Braun et al. | |
| 2006/0034326 | A1 | 2/2006 | Anderson et al. | |
| 2007/0146325 | A1 * | 6/2007 | Poston et al. | 345/163 |
| 2007/0279392 | A1 | 12/2007 | Rosenberg et al. | |
| 2008/0012826 | A1 | 1/2008 | Cunningham et al. | |

OTHER PUBLICATIONS

An article entitled "Design Considerations for Stand-alone Haptic Interfaces Communicating via UDP Protocol" by Traylor et al., 2005, Retrieved from the Internet: http://cobweb.ecn.purdue.edu/~hongtan/pubs/PDFfiles/C56_Traylor_WHC2005_extended.pdf.

* cited by examiner

*Primary Examiner* — Kevin M Nguyen
(74) *Attorney, Agent, or Firm* — V. Gerald Grafe

(57) ABSTRACT

The present invention comprises methods and apparatuses that can provide reliable communications between a computer and a haptic interface device. The methods and apparatuses can provide communication that is more secure against errors, failures, or tampering than previous approaches. Haptic devices allow a user to communicate with computer applications using the user's sense of touch, for example by applying and sensing forces with the haptic device. The host computer must be able to communicate with the haptic device in a robust and safe manner. The present invention includes a novel method of accomplishing such communication; a computer-readable medium that, when applied to a computer, causes the computer to communicate according to such a method; and a computer system having a host computer and a haptic device communicating according to such a method.

16 Claims, 11 Drawing Sheets

| Start of packet | Type of packet | Code value | Message | End of packet |
|---|---|---|---|---|
| <start> 301 | <ready> 302 | <code> 303 | < > 304 | <end> 305 |

Fig. 3

| Host computer | packet | Haptic device |
|---|---|---|
| →→→ | [start][Initialize][init][Msg][end] | →→→ |
| →→→ | [start][Start][init][Msg][end] | →→→ |
| ←←← | [start][Ready][init][Msg][end] | ←←← |
| →→→ | [start][Command][init+1][Msg][end] | →→→ |
| ←←← | [start][Status][init+2][Msg][end] | ←←← |
| →→→ | [start][Command][init+3][Msg][end] | →→→ |
| ←←← | [start][Status][init+4][Msg][end] | ←←← |
| →→→ | [start][Command][init+5][Msg][end] | →→→ |
| ←←← | [start][Status][init+6][Msg][end] | ←←← |
| →→→ | [start][Command][init+7][Msg][end] | →→→ |
| ←←← | [start][Status][init+8][Msg][end] | ←←← |
| →→→ | [start][Finish][init+9][Msg][end] | →→→ |
| ←←← | [start][Done][init+10][Msg][end] | ←←← |

Fig. 4

601. *initial.code.value* = Select initial code value
602. Transmit packet to device:
 [start-bits][Initialize][*initial.code.value*][message][end-bits]
603. Transmit packet to device:
 [start-bits][Start][*initial.code.value*][message][end-bits]
604. Receive a packet from device
605. Is packet type = Ready? NO → communication error
606. Is packet code = *initial.code.value*? NO → communication error
607. *host.code.value* = value in code sequence after *initial.code.value*
608. <u>Transmit.loop</u>: Transmit packet to device:
 [start-bits][Command][*host.code.value*][message][end-bits]
609. *expected.device.code* = value in code sequence after *host.code.value*
610. Receive a packet from device
611. Is packet type = Status? NO → communication error
612. Is packet code = *expected.device.code*? NO → communication error
613. *host.code.value* = value in code sequence after *expected.device.code*
614. Is there another Command to send to device? YES → repeat <u>Transmit.loop</u>
615. Transmit packet to device:
 [start-bits][Finish][*host.code.value*][message][end-bits]
616. *expected.device.code* = value in code sequence after *host.code.value*
617. Receive a packet from device
618. Is packet type = Status? NO → communication error
619. Is packet code = *expected.device.code* NO → communication error

Fig. 6

701. Wait until receive packet from host computer
702. Is packet type = Initialize? NO → communication error
703. Begin any device initialization
704. *initial.host.code* = code in the Initialize packet
705. Wait until receive packet from host computer
706. Is packet type = Start? NO → communication error
707. Is packet code = *initial.host.code*? NO → communication error
708. Transmit packet to host computer:
[start-bits][Ready][ *initial.host.code*][message][end-bits]
709. *expected.host.code* = value in code sequence after *initial.host.code*
710. Receive.loop: Wait for until receive packet from host computer
711. Is packet code = *expected.host.code*? NO → communication error
712. Is packet type = Finish? YES → go to Finish
713. Is packet type = Command? NO → communication error
714. Perform operations per message in packet
715. *device.code.value* = value in code sequence after *expected.host.code*
716. Transmit packet to host computer:
[start-bits][Status][*device.code.value*][message][end-bits]
717. *expected.host.code* = value in code sequence after *device.code.value*
718. Repeat Receive.loop
719. Finish: *device.code.value* = value in code sequence after *expected.host.code*
720. Transmit packet to host computer:
[start-bits][Done][*device.code.value*][message][end-bits]

Fig. 7

Haptic Device Communications Control Example

COMMUNICATIONS WITH A HAPTIC INTERFACE DEVICE FROM A HOST COMPUTER

CROSS REFERENCE TO RELATED APPLICATIONS

This application claims priority to U.S. provisional application 61/027,953, filed Feb. 12, 2008, and as a continuation of U.S. application Ser. No. 12/173,014, filed Jul. 14, 2008, which claimed priority to U.S. provisional application 61/027,953, filed Feb. 12, 2008; each of which is incorporated herein by reference.

FIELD OF THE INVENTION

This invention relates to the field of the measurement of communications between a computer and a haptic interface device, and specifically to communications methods allowing reliable communications, and hardware and software implementing such communications.

BACKGROUND OF THE INVENTION

Haptics is the scientific field that studies the sense of touch. In computing, haptics is the science and art of applying touch or force sensation to human interaction with computers. A haptic device gives people a sense of touch with computer generated environments, so that when virtual objects are touched, they seem real and tangible. An example is a medical training simulator in which a doctor can feel a scalpel cut through virtual skin, feel a needle push through virtual tissue, or feel a drill drilling through virtual bone. All of these types of interactions can feel almost indistinguishable from the real life interactions the simulator emulates. Haptics is applicable across many areas of computing including video games, medical training, scientific visualization, CAD/CAM, computer animation, engineering design and analysis, architectural layout, virtual toys, remote vehicle and robot control, automotive design, art, medical rehabilitation, and interfaces for the blind, to name a few. The word "haptics" derives from the Greek haptikos, from haptesthai, meaning "to grasp, touch, or perceive", equivalent to hap(tein) to grasp, sense, perceive.

In computing, haptics can be implemented through different types of interactions with a haptic device communicating with a computer. These interactions can be categorized into the different types of touch sensations a user can receive—force feedback, tactile feedback, and proprioception (or kinesthesia).

With force feedback, a user can feel forces applied to a user's body by the movements of a haptic device, sensed by the user primarily through musculoskeletal forces, but also through the skin that touches the physical interface to a haptic device. This can be accomplished through a user's hand grasping a handle connected within the device to motors (e.g. 3D haptic devices, like the Novint Falcon, "NOVINT" and "FALCON" are trademarks of Novint Technologies, Inc., and 2D haptic devices like force feedback steering wheels and force feedback joysticks), and can also be implemented with haptic devices that a user puts a hand, arm, or leg into (e.g. a haptic glove or sleeve); vibrating motors within something that is held (e.g. a game controller or a force feedback mouse); a vibrating or moving object that a user sits on; or any other mechanical system that can give forces or touch sensations to a user. Haptics is often accomplished through electrical motors, although there are other methods to create force sensations such as with devices that are pneumatic (air controlled), hydraulic (fluid controlled), piezoelectric (materials that expand or contract with electric current), electric (sending currents directly to a users skin or nervous system), or which use passive braking systems.

With tactile feedback, a user can feel forces applied directly to the skin, which are detected by a user through sensors within the skin called mechanoreceptors. Tactile feedback can also be applied to a user through electrical currents applied directly to the skin or objects that can vary in temperature touching the skin. For example, tactile feedback can be accomplished with pin arrays on a haptic device on which a user places a hand or finger. The pins within the pin array can slightly raise or lower as the haptic device moves, giving a sensation that the user's finger or hand is moving across a virtual object with texture.

Proprioception is the sense of where one's body is in space. For example, if you move your arm out to the side, even if your eyes are closed, you know where it is. Our sense of proprioception is derived from the forces our muscles exert within our body. Force feedback generally has a proprioceptive component, as a user's movements of a haptic device in correlation with an application create the forces one feels. Even computer input devices that are generally not considered haptic devices use our sense of proprioception, such as mice and keyboards. Kinesthesia is similar to proprioception, in that it is a sensation of strain in muscles, and through it we know our body position, but kinesthesia also includes other internal feelings such as the feeling of a full stomach.

Haptic devices have varying complexities, and can move in different ways. Force feedback devices are often described by their Degrees of Freedom (DOF). A Degree of Freedom refers to a direction of movement. Common Degrees of Freedom include right-left movement (X), up-down movement (Y), forwards-backwards movement (Z), roll (rotation about the Z axis), pitch (rotation about the X axis), and yaw (rotation about the Y axis). Degrees of Freedom can refer both to how a device keeps track of position, and how a device outputs forces. A mouse, for example, is a 2 DOF input device—it keeps track of position in the right-left Degree of Freedom, and the forward-backward Degree of Freedom. A joystick is also a 2 DOF device, but its Degrees of Freedom are different (it rotates forwards-backward, and right-left). A force feedback joystick is a 2 DOF device with force feedback. It both tracks 2 DOF and gives simple forces in 2 DOF. The Novint Falcon is a 3 DOF force feedback device. It tracks in 3 DOF (right-left, forwards-backwards, and up-down), and has actuators and an onboard controller that can supply forces in those same Degrees of Freedom. 3 DOF devices (and higher DOF devices) are significantly more complex than 2 DOF devices.

Interface devices with input-only operations generally pose little risk to users. Incorrect input can result from device failures or communications failures, but such failures do not generally directly endanger the user. A haptic device, in contrast, can exert forces on the user. Such forces, if improperly controlled, can damage the device itself and can endanger the user. For example, a haptic device might be erroneously commanded to apply maximum forces in a way that causes the device to exceed its force or velocity constraints, damaging the device. As another example, a haptic device might be erroneously commanded to suddenly change the forces presented to the user, causing injury to the user. As another example, a haptic device might be erroneously commanded to suddenly shift from maximum resistance to motion by the user to maximum forces in the direction of motion by the user, causing the device to reach a limit of its range of motion at high speed and with high forces, damaging the device and potentially injuring the user. Such unsafe conditions can arise from many sources. As an example, a communications failure such as a failed or damaged communications channel can cause commands or device status reports to be lost or corrupted. As another example, software that is not correctly configured can attempt to communicate with a haptic device. As another example, a haptic device with unexpected capabilities or limits can be connected to a host computer, and can respond in unexpected ways to commands intended for another type of haptic device. The potential risks associated with a haptic device can make it more important that all aspects of the control of and communication with the haptic device be robust and safe.

The computer industry has developed many communications standards. Contemporary standards generally address issues such as connectors, electrical requirements, cable performance, and bit-level protocols. Contemporary standards can provide high speed, high reliability, and cost-effective communications. They do not, however, provide safety and security that can be desired for safe and efficient operation of haptic interface devices. Accordingly, there is a need for communications methods, and haptic and host computer implementations of such methods, and systems comprising one or more haptic devices and one or more host computers using such methods, that combine the advantages of contemporary standards with safety and security desired for haptic interfaces.

SUMMARY OF THE INVENTION

The present invention comprises methods and apparatuses that can provide reliable communications between a computer and a haptic interface device. The methods and apparatuses can provide communication that is more secure against errors, failures, or tampering than previous approaches.

Some embodiments of the present invention provide a method of communicating between a host computer and a haptic interface device wherein the host computer initiates communication by transmitting an "Initialize" packet to the haptic device, where an Initialize packet comprises several distinct subsequences of bits: one indicating the start of the packet, one identifying the packet as an Initialize packet, one indicating a start code for a sequence of code values, one indicating a message, and one indicating the end of the packet. The host computer then transmits a "Start" packet to the haptic device, where a Start packet comprises several distinct subsequences of bits: one indicating the start of the packet, one identifying the packet as a Start packet, one repeating the start code transmitted in the Initialize packet, one indicating a message, and one indicating the end of the packet. The haptic device can monitor incoming communications, waiting for an Initialize packet followed by a Start packet, and then transmit a "Ready" packet to the host computer, where a Ready packet comprises several distinct subsequences of bits: one indicating the start of the packet, one identifying the packet as a Ready packet, one repeating the start code transmitted in the Start packet, one indicating a message, and one indicating the end of the packet. After the host computer has transmitted an Initialize packet and a Start packet, and received a corresponding Ready packet, then the host computer can transmit a "Command" packet, where a Command packet comprises several distinct subsequences of bits: one indicating the start of the packet, one identifying the packet as a Command packet, one indicating the value in a sequence of code values that follows the code value in the most recent packet from the haptic device (either the Ready packet or a more recent Status packet), one indicating a message, and one indicating the end of the packet. In response to the Command packet, the haptic device can transmit a "Status" packet to the host computer, where a Status packet comprises several distinct subsequences of bits: one indicating the start of the packet, one identifying the packet as a Status packet, one indicating the value in a sequence of code values that follows the code value in the most recent Command packet, one indicating a message, and one indicating the end of the packet. The interlocked Command/Status packets can be repeated for so long as communications are desired between the host computer and the haptic device. The host computer can transmit a "Finish" packet to the haptic device, where a Finish packet one comprises several distinct subsequences of bits: one indicating the start of the packet, one identifying the packet as a Finish packet, one indicating the value in a sequence of code values that follows the code value in the most recent packet from the haptic device (either the Ready packet or a more recent Status packet), one indicating a message, and one indicating the end of the packet. In response to a Finish packet, the haptic device can transmit a "Done" packet to the host computer, where a Done packet comprises several distinct subsequences of bits: one indicating the start of the packet, one identifying the packet as a Done packet, one indicating the value in a sequence of code values that follows the code value in the Finish packet, one indicating a message, and one indicating the end of the packet.

In some embodiments, the haptic device or the host computer can determine error conditions if the code in a packet does not match the code expected in the sequence of codes. As an example, an erroneous code in a packet from the host computer can indicate a failure of the host computer software such as a missed command. A missed command can potentially lead to dangerous operation of the haptic device, so the haptic device can enter an error state (e.g., not apply full forces) if it detects an erroneous code in a packet from the host. The code sequence can, for example, comprise a sequence of pseudorandom numbers generated using the initial code value as the seed value. In some embodiments, the haptic device can indicate specific communication requirements, e.g., the message in the Ready packet can indicate specific command sets or operating or calibration parameters. Some embodiments of the present invention comprise a host computer and a haptic device, communicating according to a method such as those described herein. Some embodiments of the present invention comprise computer-readable media containing instructions for causing a host computer to communicate with a haptic device according to a method such as those described herein.

Advantages and novel features will become apparent to those skilled in the art upon examination of the following description or can be learned by practice of the invention. The advantages of the invention can be realized and attained by means of the methods, instrumentation architectures, and combinations specifically described in the disclosure and in the appended claims.

BRIEF DESCRIPTION OF THE DRAWINGS

FIG. 3 is a schematic illustration of an example communication packet suitable for use in the present invention.

FIG. 4 is a schematic illustration of communication between a host computer and a haptic interface device, using packets of the type illustrated in FIG. 3.

FIG. 6 is a schematic illustration of an example state-based operation implementing an example embodiment of the present invention on a host computer.

FIG. 7 is a schematic illustration of an example state-based operation implementing an example embodiment of the present invention on a haptic device.

DETAILED DESCRIPTION OF THE INVENTION

Figure 1:
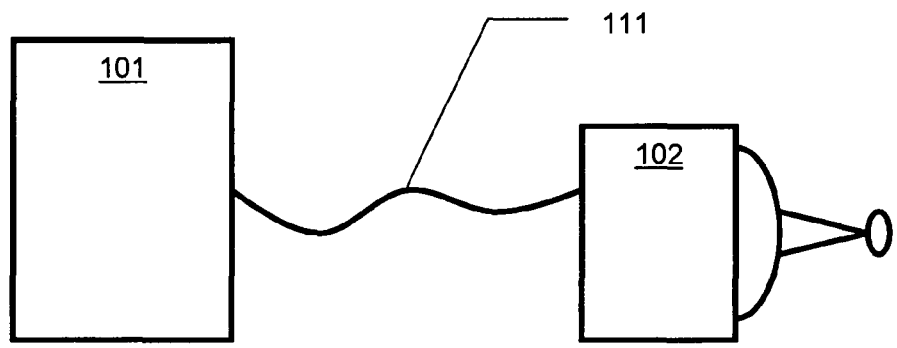
FIG. 1 is a schematic illustration of a system comprising a host computer and haptic interface device according to an example embodiment of the present invention.

The present invention comprises methods and apparatuses that can provide reliable communications between a computer and a haptic interface device. Reliable communications can include security and authentication of the devices and systems involved in the communications. For example, it can be important to ensure that unauthorized users cannot utilize the haptic device, e.g., to avoid hazards related to user or system safety, viruses or malicious programs, and counterfeit or other programs that may not be certified as safe to use with the device. As another example, it can be important to ensure that unauthorized haptic devices do not communicate with a particular computer application, e.g., to avoid hazards related to unsafe forces or operational modes (if the unauthorized device does not behave as the application expects), and to discourage use of the application in violation of license restrictions (if the license is limited to use with a particular device or class of devices).

Some embodiments of the present invention provide a method of communicating between a host computer and a haptic interface device wherein the host computer initiates communication by transmitting an "Initialize" packet to the haptic device, where an Initialize packet comprises several distinct subsequences of bits: one indicating the start of the packet, one identifying the packet as an Initialize packet, one indicating a start code for a sequence of code values, one indicating a message, and one indicating the end of the packet. The host computer then transmits a "Start" packet to the haptic device, where a Start packet comprises several distinct subsequences of bits: one indicating the start of the packet, one identifying the packet as a Start packet, one repeating the start code transmitted in the Initialize packet, one indicating a message, and one indicating the end of the packet. The haptic device can monitor incoming communications, waiting for an Initialize packet followed by a Start packet, and then transmit a "Ready" packet to the host computer, where a Ready packet comprises several distinct subsequences of bits: one indicating the start of the packet, one identifying the packet as a Ready packet, one repeating the start code transmitted in the Start packet, one indicating a message, and one indicating the end of the packet. After the host computer has transmitted an Initialize packet and a Start packet, and received a corresponding Ready packet, then the host computer can transmit a "Command" packet, where a Command packet comprises several distinct subsequences of bits: one indicating the start of the packet, one identifying the packet as a Command packet, one indicating the value in a sequence of code values that follows the code value in the most recent packet from the haptic device (either the Ready packet or a more recent Status packet), one indicating a message, and one indicating the end of the packet. In response to the Command packet, the haptic device can transmit a "Status" packet to the host computer, where a Status packet comprises several distinct subsequences of bits: one indicating the start of the packet, one identifying the packet as a Status packet, one indicating the value in a sequence of code values that follows the code value in the most recent Command packet, one indicating a message, and one indicating the end of the packet. The interlocked Command/Status packets can be repeated for so long as communications are desired between the host computer and the haptic device. The host computer can transmit a "Finish" packet to the haptic device, where a Finish packet one comprises several distinct subsequences of bits: one indicating the start of the packet, one identifying the packet as a Finish packet, one indicating the value in a sequence of code values that follows the code value in the most recent packet from the haptic device (either the Ready packet or a more recent Status packet), one indicating a message, and one indicating the end of the packet. In response to a Finish packet, the haptic device can transmit a "Done" packet to the host computer, where a Done packet comprises several distinct subsequences of bits: one indicating the start of the packet, one identifying the packet as a Done packet, one indicating the value in a sequence of code values that follows the code value in the Finish packet, one indicating a message, and one indicating the end of the packet.

In some embodiments, the haptic device or the host computer can determine error conditions if the code in a packet does not match the code expected in the sequence of codes. As an example, an erroneous code in a packet from the host computer can indicate a failure of the host computer software such as a missed command. A missed command can potentially lead to dangerous operation of the haptic device, so the haptic device can enter an error state (e.g., not apply full forces) if it detects an erroneous code in a packet from the host. The code sequence can, for example, comprise a sequence of pseudorandom numbers generated using the initial code value as the seed value. In some embodiments, the haptic device can indicate specific communication requirements, e.g., the message in the Ready packet can indicate specific command sets or operating or calibration parameters. Some embodiments of the present invention comprise a host computer and a haptic device, communicating according to a method such as those described herein. Some embodiments of the present invention comprise computer-readable media containing instructions for causing a host computer to communicate with a haptic device according to a method such as those described herein.

FIG. 1 is a schematic illustration of a host computer and haptic interface device according to an example embodiment of the present invention. A host computer 101 and a haptic interface device 102 communicate via a communications channel 111. The host computer can comprise, as examples, a personal computer such as those currently available from vendors such as Apple, Hewlett Packard, and Dell; a computer game console such as those currently available from Microsoft, Nintendo, and Sony; and a specialized computer appliance such as dedicated point of sale systems, image viewing systems, and internet browsing systems. The haptic interface device can comprise, as examples, devices such as those available from Novint Technologies, Inc.; SensAble Technologies Inc., Force Dimension, Quanser, Fokker Control Systems; MPB Technologies Inc.; and Immersion Corp. The communications channel can comprise, as examples, current standard interfaces such as USB, Firewire; RS232; RS422; IEEE 802.11 (WiFi); Bluetooth, Ethernet (802.3); infrared, optical, acoustic, and radio interfaces; and custom communication channels. The host computer 101 and the haptic interface device 102 can communicate over the communication channel using the methods described herein.

Figure 2:
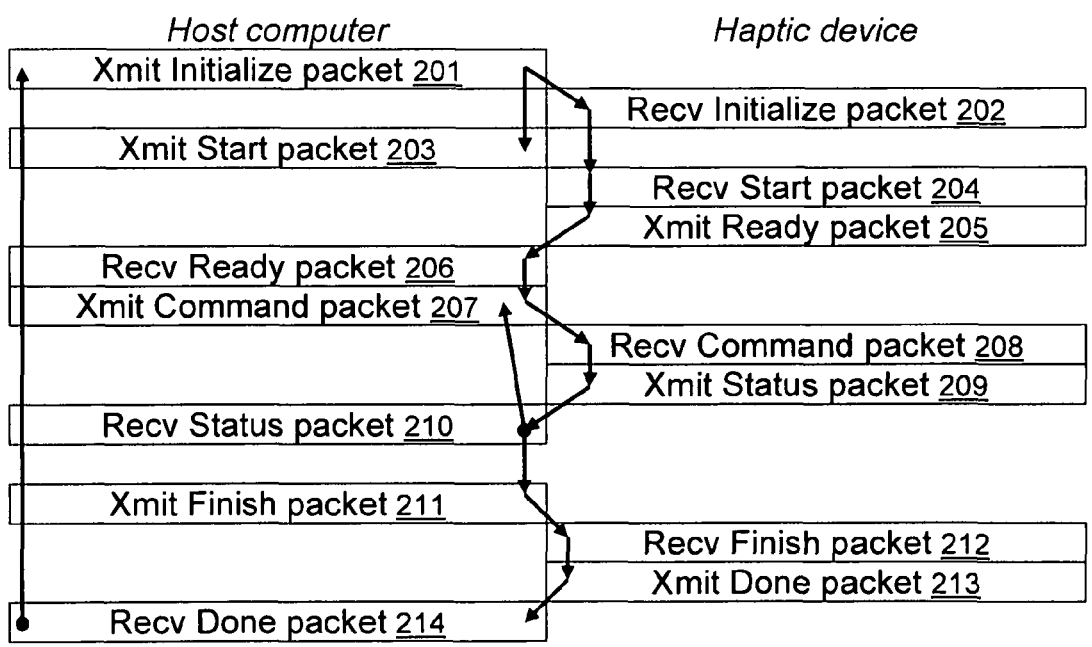
FIG. 2 is a flow chart of packet-based communication between a host computer and a haptic interface device according to an example embodiment of the present invention.

FIG. 2 is a schematic flow diagram of communication between a host computer and a haptic interface device according to an example embodiment of the present invention. The host computer, when it is determined that communication with the haptic device is desired (e.g., when starting a computer game program) transmits to the haptic device a "Initialize" packet 201, followed by a "Start" packet 203. The haptic device, after receipt of a valid Initialize packet 202 followed by a valid Start packet 204, transmits a "Ready" packet 205 to the host computer. The host computer, after receipt of a valid Ready packet 206, can transmit a "Command" packet 207 to the haptic device, where the Command packet can direct certain haptic or communications actions on the part of the haptic device. For example, a Command packet might request a information about the current state or position of the haptic device, or might direct the application of certain forces by the haptic device. After receipt of a valid Command packet 208, the haptic device can transmit a Status packet 209 to the host computer. A Status packet can communicate information concerning the haptic device to the host computer; for example present position of the haptic device, and acknowledgement of previous Command packets. The host computer, after receiving a valid Status packet 210, can repeat the process with a new Command packet 207, to which the haptic device will respond with another Status packet 209. When the host computer has determined that communication with the haptic device is not required (e.g., the game program has ended or entered a state not requiring haptic interaction, or a communication error has occurred), the host computer can transmit to the haptic device a "Finish" packet 211. The haptic device, after receiving a valid Finish packet 212, can transmit to the host computer a "Done" packet 213. The host computer can receive the Done packet 214 and be assured that the haptic device is no longer expecting commands from the host computer. The interlocking nature of the packet transmissions and receipt can ensure that each step of the communication process is properly completed. This can be especially important in haptic interaction since, for example, repeated commands or missed status updates can lead to potentially dangerous forces.

As discussed later, the security and reliability of the communications can be enhanced by use of the content of the packets, the ordering of the packets, the timing of the packets, or combinations thereof. As one example, after transmission of a Start packet and before receipt of a Done packet, the host computer transmits packets at a rate of at least 10 per second, or a rate of at least 50 packets per second, to allow the host computer and haptic device to determine when a communication fault or computer or device fault might have compromised the operation of the system.

FIG. 3 is a schematic illustration of an example communication packet suitable for use in the present invention. The packet comprises a sequence of data items; in a common digital communication channel, the packet can comprise a sequence of binary bits of information. The packet sequence can be logically divided into 5 distinct subsequences, or substrings of binary bits. The first subsequence 301 is a substring (or field) that indicates the start or beginning of a packet. The start substring can comprise a unique bit pattern, or any of a plurality of bit patterns, provided that the haptic device and the host computer recognize a start bit pattern on packets received by them. The next subsequence 302 is a substring that indicates the type of packet. This substring can have a unique bit assignment for each of several different types of packets, as described below. The next subsequence 303 is a substring that indicates a code value in a sequence of values, as described below. The next subsequence 304 is a substring that indicates a message communicated by the packet. Messages can comprise any information desired to communicate between the host computer and the haptic interface device; as examples, messages can comprise commands to apply forces, status information regarding position or forces, commands to enable certain features (e.g., lights or sounds), status information regarding the device or the software operating on the host computer (e.g., version number, or identity of a supported command set), and information regarding the communication itself (e.g., specification of a method of code generation, specification of packet substring definitions). The last subsequence 305 is a substring of bits that indicates the end of a packet. The end substring start substring can comprise a unique bit pattern, or any of a plurality of bit patterns, provided that the haptic device and the host computer recognize an end bit pattern on packets received by them. FIG. 4 is a schematic illustration of communication between a host computer and a haptic interface device, using packets of the type illustrated in FIG. 3.

Types of packets. Communication according to the present invention can comprise various types of packets. As described in connection with FIG. 2, an Initialize packet can be used to initiate the communication process. A Start packet can be used to begin communications. A Ready packet can be used as a response from the haptic device to proper Initialize and Start packets. Command packets can be used to communicate information from the host computer to the haptic device. Status packets can be used to communicate information from the haptic device to the host computer. A Finish packet can be used by the host computer to indicate that a particular communication session is complete. A Done packet can be used as a response from the haptic device to a Finish packet. Some of these functions can be achieved within a single packet type. As an example, the Initialize packet can be a Start packet (i.e., the Initialize packet in some embodiments can the Start packet type encoding instead of a unique packet type encoding). As another example, the Command and Status packets can have the same packet type encodings if the source of the packet (e.g., host computer or haptic device) allows discrimination between them. As another example, the Finish and Done packets can have the same packet type encodings. The packet type encoding can also be combined with the Message subsequence, for example a single "Command/Status" packet type can be used, with the value of the Message field indicating the specific command or status function desired.

Other packet types can also be useful in some embodiments. For example, some packets can serve diagnostic purposes, such as an "Error" packet sent when an error is detected by the host computer or the haptic device, or a "Timeout" packet sent when the host computer or the haptic device does not receive a communication within a selected time. Monitoring the timing or rate of communications can be especially significant in communications with a haptic device since forces, applied over too long a time, can have undesirable effects. As an example, if the host computer transmits a Command packet to apply large forces, then does not quickly transmit another Command packet to reduce or change those forces (e.g., before the haptic device reaches an extreme of its range of motion), injury to the device or the user can occur.

Minimum communication rates of 10 packets per second can be suitable in some applications, 50 packets per second can be suitable in other applications.

The packet type encodings can be, as an example:
Initialize packet is 4E 77 6D 6C 6C 6C 6F 4D in hexadecimal notation;
Start packet is 4E 77 6D 6C 6C 6C 6F 4D in hexadecimal notation;
Ready packet is 42 69 6C 6C 69 6F 6E 53 in hexadecimal notation;
Command packet is 61 43 4F 6D 6D 41 4E 44 in hexadecimal notation;
Status packet is 48 44 73 74 41 54 55 53 in hexadecimal notation;
Finish packet is 57 68 6D 6F 62 61 63 52 in hexadecimal notation;
Done packet is 38 77 61 61 74 67 61 38 in hexadecimal notation.

A Command packet type (or specific message encoding within another predetermined packet type) can establish or change parameters of the communications. As an example, a Command packet can be used to establish or change the determination of the sequence of code values. As another example, a Command packet can be used to communicate specifications of a command set or status format that is desired, for example by the host computer communicating a packet that indicates a version of device commands that the host computer is using. A Command packet (or message within another predetermined packet type) can be used to indicate a device type (e.g., how many degrees of freedom, or even a unique device identifier) or a host computer software configuration (e.g., what driver version is used, or what units are expected in Status packets).

A Status packet type (or specific message encoding within another predetermined packet type) can similarly establish or change parameters of the communications. As an example, a Status packet can be used to establish or change the determination of the sequence of code values. As another example, a Status packet can be used to communicate specifications of a command set or status format that is desired, for example by the haptic device communicating a packet that indicates a version of device commands that is compatible with the haptic device. A Status packet (or message within another predetermined packet type) can be used to indicate a device type (e.g., how many degrees of freedom, or even a unique device identifier) or a host computer software configuration (e.g., what driver version is used, or what units are expected in Command packets).

Code Values. A potential risk in communications with a haptic device is that one or more packets might be lost, for example due to intermittent failures in the communications channel (e.g., wireless communications signal temporarily lost) or due to conflicts in the communications channel (e.g., device conflicts on a USB interface). Packets in the present invention include a Code value field that can mitigate this risk.

The Code field can be used by the host computer and haptic device to ensure that the packet communication remains exactly in step. The value in the Code field of a packet is determined according to a defined rule, and depends on the value in the Code field of one or more preceding packets (generally just the immediately preceding packet, although in some embodiments the value can depend on the values in several preceding packets). As a simplified example, illustrated in FIG. 4, the Code field could represent a simple binary count. The Initialize and Start packets from the host computer can have an initial value for the count. The Ready packet from the haptic device can echo the initial value. The next packet from the host computer will then have the next value in the count, or it will be recognized as an error by the haptic device (since the haptic device "knows" the initial value, and can determine that the next valid packet from the host computer should have the next value in the count). The responsive packet from the haptic device will then have the value in the count after that in the host packet, or it will be recognized as an error by the host computer (since the host computer "knows" the value that was in the host packet sent, and can determine that the responsive valid packet from the haptic device should have the next value in the count).

The use of a simple count, as in the above example, can make it easier for malicious software to more easily mimic a properly operating host computer or haptic device. As an example, malicious software could "hijack" the communications channel and issue apparently valid Command packets that had the effect of delivering poor device performance, incorrect device performance, damaging the device, or even injuring the user. A more complex sequence of code values can be used to reduce this risk. For example, the code value sequence can be determined by a pseudorandom number generator. The initial value can be used as the seed for the pseudorandom number generator. The host computer and the haptic device can then determine the numbers in the sequence of pseudorandom numbers according to a predetermined method. The resulting sequence will be determinable, but not as readily mimicked. As another example, the code sequence can be one of many predetermined code sequences, with the particular sequence determined by the initial value. As another example, the code sequence can be a sequence generated by a combination of an integer count (like that described in connection with FIG. 4) with the initial value (e.g., an exclusive OR operation, or a circular bit shift of the count by the number in the initial value, or a more complex operation). As another example, a packet (e.g., a Command or Status or Control packet) can indicate a change in the determination of code values, for example by supplying a new seed for the pseudorandom number generator, or by indicating a new method of determining the code sequence.

A pseudorandom number generator (PRNG) is a method for generating a sequence of numbers that approximate the properties of random numbers. The resulting sequence is generally not truly random but is determined by initial values used to start the method. Typically, however, the sequence of numbers is difficult to predict unless the details of the PRNG implementation are known. One example of a PRNG is the Middle-Square Method suggested by John von Neumann in 1946. In the Middle-Square method: 1) take any number; 2) square it; 3) use the middle digits of the result as the new number for another squaring operation. For example, starting with the number 34350, the square is 1179922500. The new number is 99225. Repeating the process you get 79360 and then 98000. This method is provided for illustrative purposes only since it is not particularly robust (i.e., the numbers repeat within a relatively short period of time). More robust PRNGs are known, including the Mersene Twister algorithm; the Yarrow algorithm; Linear Congruential Generators; multiply-with-carry methods; and PRNGs using a Linear Feedback Shift Register. See, e.g., Marsaglia, George, Random Number Generators, Journal of Modern Applied Statistical Methods, May 2003, Vol 2, No 1, 2-13; M. Matsumoto & T. Nishimura, "Mersenne twister: a 623-dimensionally equidistributed uniform pseudorandom number generator", ACM Trans. Model. Comput. Simul. 8, 3 (1998); P. L'Ecuyer, "Tables of Linear Congruential Generators of Different Sizes and Good Lattice Structure", Mathematics of Computation 68:225, 249-260 (1999); J. Kelsey, B. Schneier, and N. Ferguson. Yarrow-160: Notes on the design and analysis of the yarrow cryptographic pseudorandom number generator. In H. Heys and C. Adams, editors, Selected Areas in Cryptography, SAC'99, number 1758 in LNCS. Springer, 2000; each of which is incorporated herein by reference.

Figure 5:
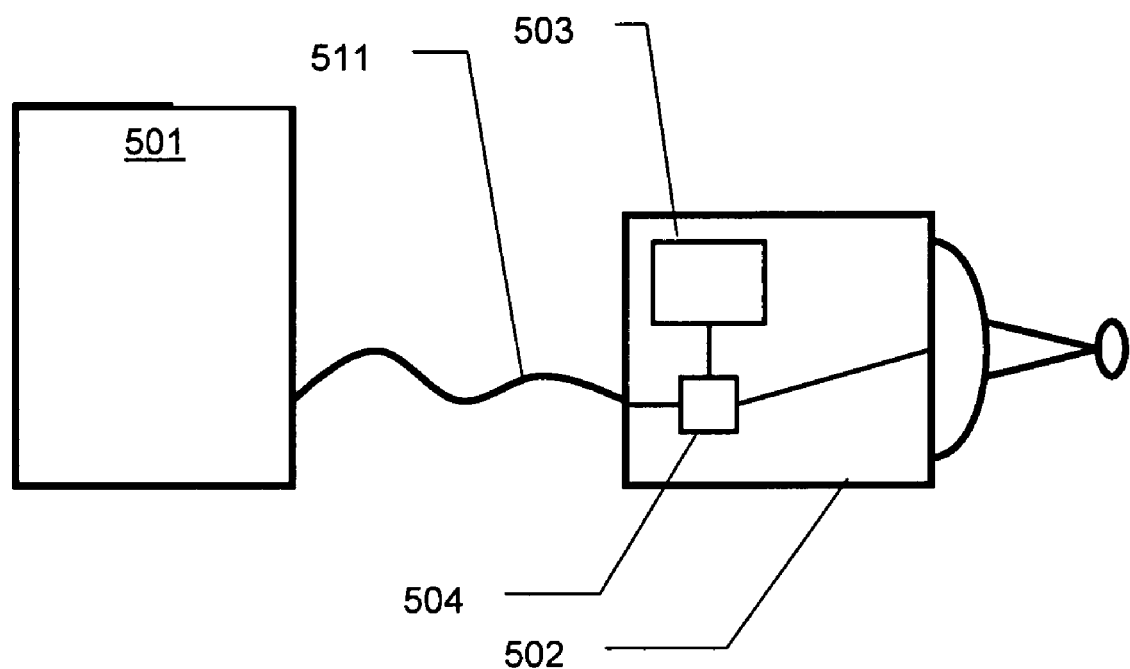
FIG. 5 is a schematic illustration of a system according to an example embodiment of the present invention.

Example Haptic Device. FIG. 5 is a schematic illustration of a system according to an example embodiment of the present invention. A host computer 501 and a haptic device 502 communicate as has been described. The haptic device 502 comprises a communication interface system 504, a communication supervisor system 503, and motors and controllers for the haptic device (not specifically illustrated in the figure). The communication supervisor system 503 monitors communications from the host computer. If a communication from the host computer is not in conformance with the defined packet communications method, then the communication supervisor system can disable further communications with the rest of the haptic device (e.g., to prevent incorrect commands from reaching the haptic device and causing improper operation). An example implementation of such a system is the Falcon interface device from Novint Technologies, Inc., communicating over a USB 2.0 link with a personal computer running the Windows XP operating system from Microsoft.

Examples of Haptic Device Communications Control.

FIG. 7 is a schematic illustration of state-based operation implementing an example embodiment of the present invention on a haptic device. The device waits until it receives a packet from a host computer 701. If the first packet is not an Initialize packet then a communication error has occurred 702. If the packet is an Initialize packet, then the device can begin any appropriate device initialization 703. The code in the packet from the host is remembered 704. The device waits until it receives a second packet from the host 705. If the second packet is not a Start packet, then a communication error has occurred 706. If the code in the second packet does not match the code expected by the device, then a communication error has occurred 707 (in the example, the device expects the same code in the Start packet as was in the Initialize packet; different codes could be used as long as the device is able to determine the expected code). If there has been no error, then the device sends a Ready packet to the host 708, using the same code as was in the Initialize packet (or, in other example embodiments, a different code, provided that both device and host cad determine what code is expected). The device then waits for a subsequent packet from the host 710. If the code in the subsequent packet does not match the expected code 709, then a communication error has occurred 711. If the packet is a Finish packet 712, then the device determines the next code value, and sends a Done packet to the host 720. If the packet if not a Finish packet, and it is not a Command packet, then a communication error has occurred 713. If the device is a Command packet, then the device can perform the operations indicated in the Command packet 714. The device sends a Status packet to the host computer 716, with the next code in the sequence 715. The device then waits again 718 for a packet from the host with a correct code 717.

Figure 8A:
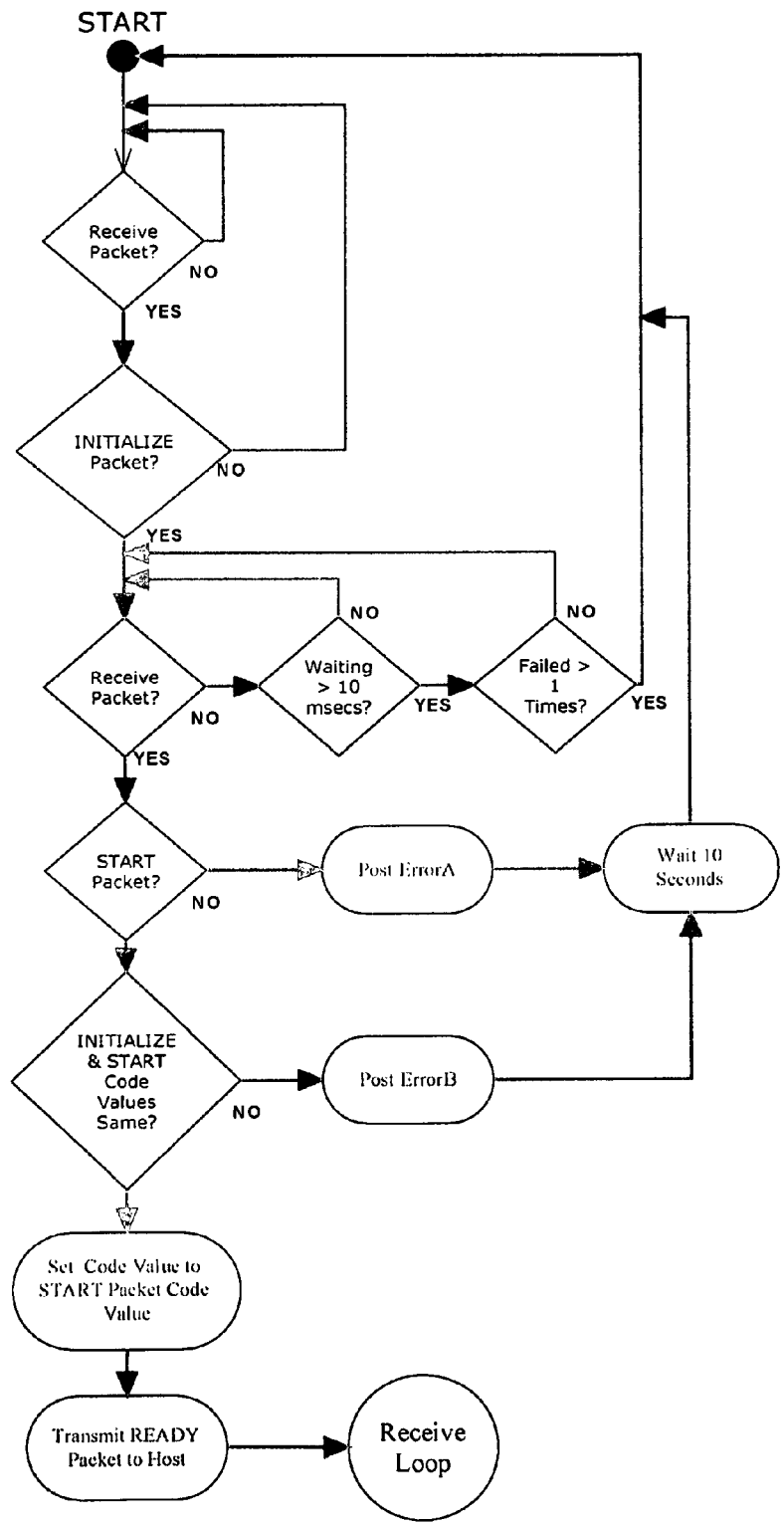
FIGS. 8(a,b,c) comprise a schematic illustrations of an example embodiment of the present invention as implemented on a haptic device.

FIGS. 8(a,b,c) comprise schematic illustrations of an example embodiment of the present invention as implemented on a haptic device. In FIG. 8a, the state diagram begins with START. The device waits to Receive a packet, and returns to START if no packet is received. If a packet is received, the device checks whether the packet is an INITIALIZE packet. If not, the device returns to the START state. If the packet is an INITIALIZE packet, then the device waits again to receive a packet. If the device has been waiting more than 10 milliseconds, or there has been more than a single error, then the device returns to the START state. The ten millisecond limit and limited number of failures allows allow the haptic device to detect if, for example, the communications channel has been temporarily interrupted (which could lead to lost packets) or the host has abnormally terminated communications. In either of those situations, the haptic device, to ensure safe operation, can ignore the host computer until the host restarts a communications session. If a packet is received, the device checks it for a START packet. If the packet is not a START packet, then the device posts ErrorA (see error descriptions below), and waits for 10 seconds, then returns to the START state. The 10 second wait can discourage attempts to circumvent the communication protocol by making repeated attempts time-consuming, making it less likely than inappropriate communications will be able to put the haptic device in a dangerous condition. The 10 second wait can also allow the haptic device to return to a safe condition before allowing a new communication session. If the packet is a START packet, then device determines whether the code values in the START packet and the INITIALIZE packet match. If they do not, then the device posts ErrorB, and returns to the START state. If they do match, then the device sends a READY packet to the host, with the same code embedded in the READY packet, and goes to the Receive Loop. Receipt of any packet sequence other than INITIALIZE followed by START, with the expected codes embedded in the packets, can indicate an unreliable communications channel (e.g., losing or corrupting packets) which could lead to unsafe operation of the haptic device if later COMMAND packets were lost or corrupted. Incorrect packets can also indicate an unauthorized host (e.g., a host that is trying to communicate with a different type of device); the haptic device should not try to implement COMMAND packets in such a scenario since the COMMAND packets might lead to unsafe operation.

Figure 8B:
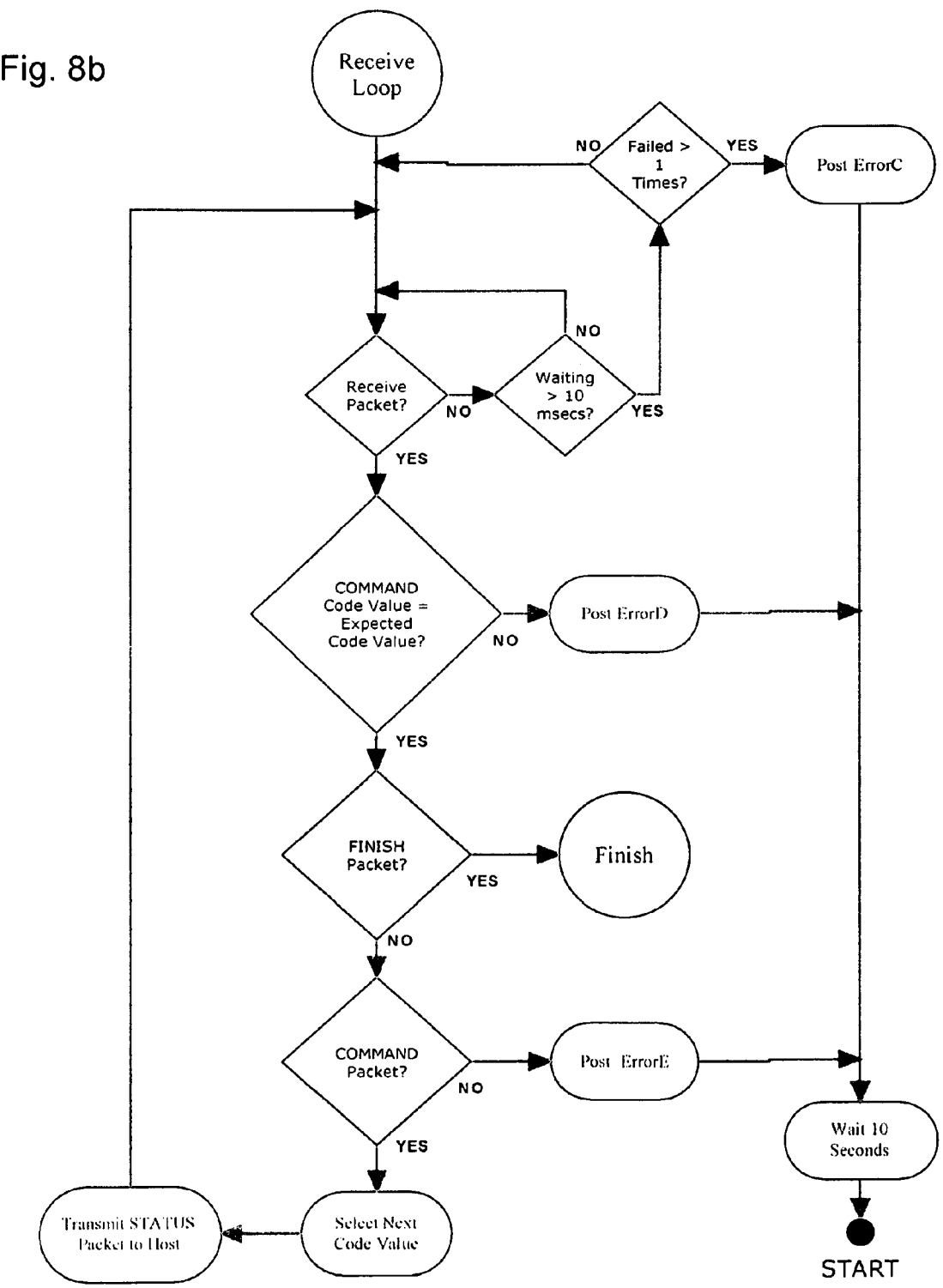

FIG. 8b illustrates the Receive Loop. The device waits to receive a packet. If the device has been waiting more than 10 milliseconds, and there has been more than one failure, then the device posts ErrorC and waits for 10 seconds before returning to the START state. The ten millisecond limit and limited number of failures allows allow the haptic device to detect if, for example, the communications channel has been temporarily interrupted (which could lead to lost packets) or the host has abnormally terminated communications. In either of those situations, the haptic device, to ensure safe operation, can ignore the host computer until the host restarts a communications session. The 10 second wait can discourage attempts to circumvent the communication protocol by making repeated attempts time-consuming, making it less likely than inappropriate communications will be able to put the haptic device in a dangerous condition. The 10 second wait can also allow the haptic device to return to a safe condition before allowing a new communication session. When a packet is received, the device checks whether the code value in the received packet matches that expected from the defined code sequence. If it does not, then the device posts ErrorD and waits for 10 seconds before returning to the START state. The 10 second wait can discourage attempts to circumvent the communication protocol by making repeated attempts time-consuming, making it less likely than inappropriate communications will be able to put the haptic device in a dangerous condition. The 10 second wait can also allow the haptic device to return to a safe condition before allowing a new communication session. If the packet if a FINISH packet, then the device goes to the Finish operation. If the packet is not a FINISH packet or a COMMAND packet, then the device posts ErrorE and waits for 10 seconds before returning to the START state. The 10 second wait can discourage attempts to circumvent the communication protocol by making repeated attempts time-consuming, making it less likely than inappropriate communications will be able to put the haptic device in a dangerous condition. The 10 second wait can also allow the haptic device to return to a safe condition before allowing a new communication session. If the packet is a COMMAND packet, then the device can operate according to the command, and sends a STATUS packet to the host (with the next code value embedded in the STATUS packet), and return to waiting for the next packet from the host.

Figure 8C:
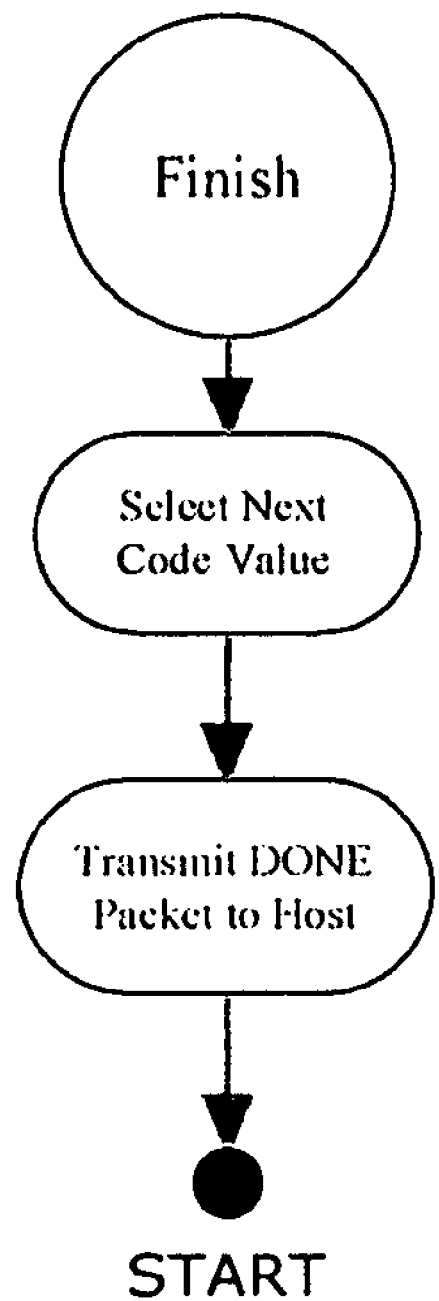

FIG. 8c illustrates the Finish operation. The device transmits a DONE packet to the host, with the next code value embedded in the DONE packet. The device then returns to the START state. A 10 second wait is not necessary since the host communications, including sequence of packet types and embedded codes, was all in accord with the expected communications, and thus there is no indication that inappropriate or unsafe communications have occurred.

The state chart shows an example implementation of communications control on the haptic device. The process shown in the state chart can be implemented on any sufficiently capable computational or logic element on a haptic device that also has the capability of accessing the appropriate haptic device communication channel.

As one example, in an implementation suitable for use with a Novint Falcon haptic interface device, the process shown in the state chart can be specifically implemented using the C programming language on a digital signal processor (DSP), such as for example a Texas Instruments DSP model TMS320R2811PBKA. Communications to the host computer can be accomplished using USB 2.0 communications protocols and hardware. The USB hardware (e.g., Future Technology Devices International Ltd USB controller model FT232BL) interfaces with the DSP to allow the communications control protocol code implemented on the DSP to communicate to the host computer.

The USB communication channel is opened when the haptic device enters the START state shown in the state chart and closed when the device enters the END state shown in the state chart. Anywhere the state charts shows "Transmit", information is transmitted on the USB communication channel using the USB driver package. Information is, correspondingly received by the device anywhere where the state chart shows "Receive". Anytime the device enters the START state the forces and torques generated by the haptic device can be set to zero for safety purposes.

The process shown in the state chart detects communication protocol errors during communication/interaction with the host computer. Depending on the protocol error highlighted by the communication process, the haptic communication interface can take different actions. After many errors are detected, the communication protocol inserts a wait (e.g., 10 seconds) before exiting. This wait can discourage unauthorized users from trying to reverse engineer the communications control protocol, for example, to defeat safety or security protocols. An explanation of the errors shown in the state chart and appropriate actions is found below.

ErrorA is caused by a wrong type of packet received by haptic device from host computer; indicating that the communications protocol has been violated. When ErrorA is posted, the haptic device terminates the communication session with the host, and waits 10 second before entering the START state. The forces and torques applied by the haptic device can be set to zero, or some other safe state, when ErrorA is posted. ErrorB is caused by a wrong Code Value received by haptic device from host computer, indicating that the communications protocol has been violated. When ErrorB is encountered, the haptic device terminates the communication session with the host, and waits 10 second before entering the START state. The forces and torques applied by the haptic device can be set to zero, or some other safe state such as applying just damping forces, and the haptic device put in a Safe mode comprising a configuration of the geometry and forces corresponding to the haptic device such that the likelihood of user injury and device damage are minimized, when ErrorB is posted. Note that the haptic device can be put into such a Safe mode except during the time (a) after receipt of a valid Start packet and (b) before receipt of a valid Finish packet. ErrorC is caused by the host failing to continue communications with the haptic device, for example if the host computer is not ready (perhaps a power failure), or an incorrect implementation of the communication protocol on the host computer. When ErrorC is encountered, the haptic device terminates the communication session with the host, and waits 10 second before entering the START state. The forces and torques applied by the haptic device can be set to zero, or some other safe state, when ErrorC is posted. ErrorD is caused by a wrong code value is received by the haptic device from the host computer, indicating that the communication protocol has been violated. When ErrorD is encountered, the haptic device terminates the communication session with the host, and waits 10 second before entering the START state. The forces and torques applied by the haptic device can be set to zero, or some other safe state, when ErrorD is posted. ErrorE is caused by a wrong type of packet being received by the haptic device from the host computer, indicating that the communications protocol has been violated. When ErrorE is encountered, the haptic device terminates the communication session with the host, and waits 10 second before entering the START state. The forces and torques applied by the haptic device can be set to zero, or some other safe state, when ErrorE is posted.

Examples of Host Computer Communications Control.

FIG. 6 is a schematic illustration of state-based operation implementing an example embodiment of the present invention on a host computer. In this example, the host computer selects an initial code value 601. The host then transmits an Initialize packet to the haptic device 602, and a Start packet to the haptic device 603. The host awaits a packet from the device 604. If the packet received from the device is not a Ready packet, then a communication error has occurred 605. Also, if the code in the packet received from the device does not match the expected code value, then a communication error has occurred 606 (the expected code value can be anything that the host computer can predict, in the example the host computer expects the haptic device to return the initial code value sent from the host computer to the device). The host computer then determines the code to insert in the next packet 607 (in the example, the next code in a sequence determined according to a method such as those described elsewhere in this specification). The host computer can then send a Command packet to the device 608. The host determines the code expected in the next packet from the device 609. When the packet is received from the device 610, the host indicates a communication error if the packet type is not a Status packet 611 or if the code in the device packet does not match the expected code 612. The host determines a code to include in the next packet to be sent from the host 613 (in the example, the code value next in the sequence after the code expected in the device packet). If there are more Command packets to send to the device 614, then the host repeats the transmit process. If not, then the host sends a Finish packet to the device 615. The host receives a packet from the device 617, and indicates a communication error if the packet is not a Status packet 618. The host also indicates a communication error 619 if the code in the packet does not match the code expected to be in the packet 616.

Figure 9A:
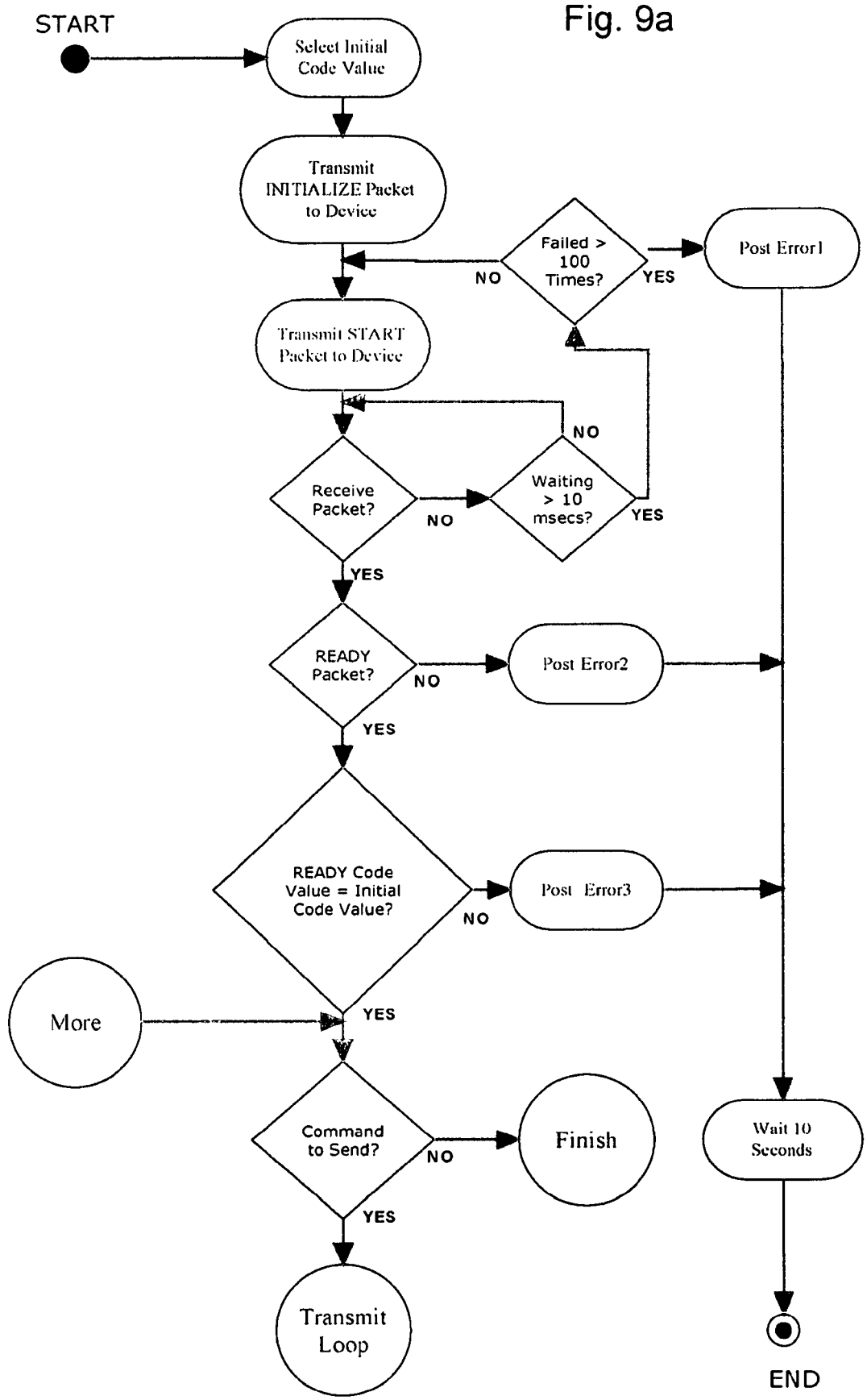
FIGS. 9(a,b,c) comprise schematic illustrations of an example embodiment of the present invention as implemented on a host computer.

FIGS. 9(*a,b,c*) comprise schematic illustrations of an example embodiment of the present invention as implemented on a haptic device. In FIG. 9*a*, the state diagram begins with START, a state in which the host desires to communicate with the haptic device but is not currently doing so. The host selects an initial code value, and transmits an INITIALIZE packet, with the initial code embedded in the packet, to the haptic device. The host then transmits a START packet to the haptic device, in the example with the same code embedded in the START packet as was embedded in the INITIALIZE packet (although, in other embodiments, a different code can be embedded in the START packet as long as the haptic device can detect whether the code in the START packet corresponds to a code sequence expected by the haptic device). The host then waits to receive a packet from the device. If the host does not receive a packet from the device within 10 milliseconds, and there have been more than one hundred failures, then the host posts Error1 and waits 10 seconds before going to the END state. The 10 millisecond wait, and the limited number of allowed errors, can reduce the likelihood that the host communicates with a faulty haptic device, or communicates with a device over an unreliable communications channel (which could lead to unsafe behavior of the haptic device, for example if host commands required for safety were lost by the unreliable communications channel). If the device sends a packet but the packet is not a READY packet, then the host posts Error2, and waits ten seconds before entering the END state. If the packet from the device is a READY packet, but does not have the expected code embedded in it, then the host posts Error3 and waits ten seconds before entering the END state. In the example, the expected code is the same as the code sent by the host in the START packet; in other embodiments the code can be another code as long as the host can determine whether the code returned from the haptic device corresponds to an expected code consistent with proper operation of the haptic device. A return of a packet other than a READY packet, or a packet with an incorrect code embedded, can indicate an unreliable communications channel, or a device that is not operating as expected by the host; either situation could lead to unsafe operation of the haptic device as host commands are lost or misinterpreted. If the host has no command to send, then the host goes to the FINISH sequence. If the host does have a command to send, then the host goes to the Transmit Loop.

Figure 9B:
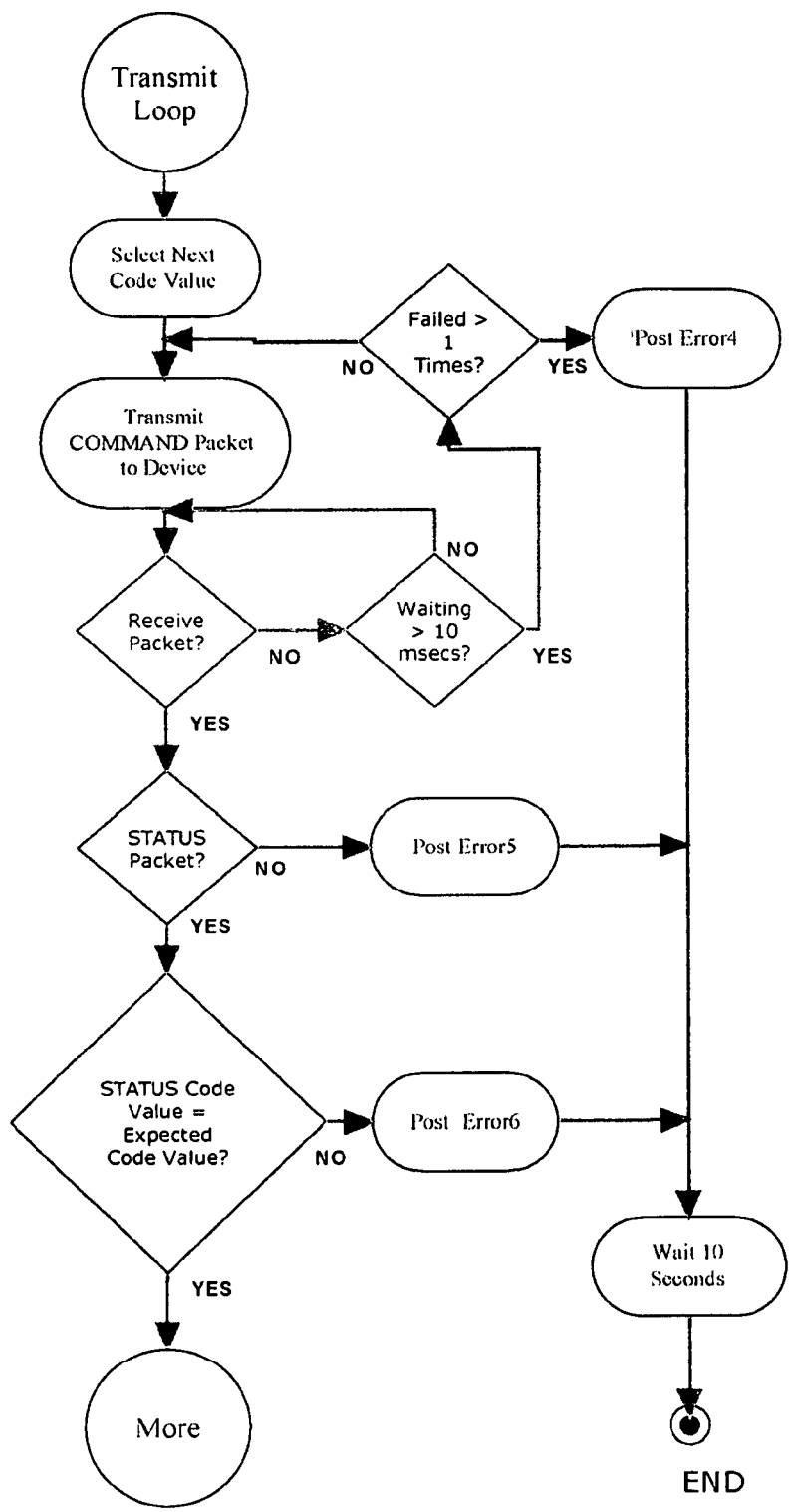

FIG. 9*b* illustrates the Transmit Loop. The host determines the next code value in the sequence of code values, and transmits a COMMAND packet, with the code value embedded in the packet, to the device. The host then waits to receive a packet from the device; if no packet is received within 10 milliseconds, and more than one failure has occurred, then the host posts Error4 and waits ten seconds before entering the END state. The 10 millisecond limit, and the limited number of allowed errors, can reduce the likelihood that the host communicates with a faulty haptic device, or communicates with a device over an unreliable communications channel (which could lead to unsafe behavior of the haptic device, for example if host commands required for safety were lost by the unreliable communications channel). If the device sends a packet but the packet is not a STATUS packet, then the host posts Error5, and waits ten seconds before entering the END state. If the packet from the device is a STATUS packet, but does not have the expected code embedded in it, then the host posts Error6 and waits ten seconds before entering the END state. In the example, the expected code is the next code in a sequence of codes, after the code sent by the host in the immediately preceding COMMAND packet; in other embodiments the code can be another code as long as the host can determine whether the code returned from the haptic device corresponds to an expected code consistent with proper operation of the haptic device. In such a case, the host can use the code sequence indicated by the STATUS packet to determine the code to be used in the next COMMAND packet. The first STATUS packet can also be used to inform the host of specific capabilities of the haptic device, such that subsequent COMMAND packets can be optimized for the particular haptic device. A return of a packet other than a STATUS packet, or a packet with an incorrect code embedded, can indicate an unreliable communications channel, or a device that is not operating as expected by the host; either situation could lead to unsafe operation of the haptic device as host commands are lost or misinterpreted. If the packet received from the device is a STATUS packet with the appropriate embedded code, then the host goes to the MORE state (illustrated in FIG. 9*a*).

Figure 9C:
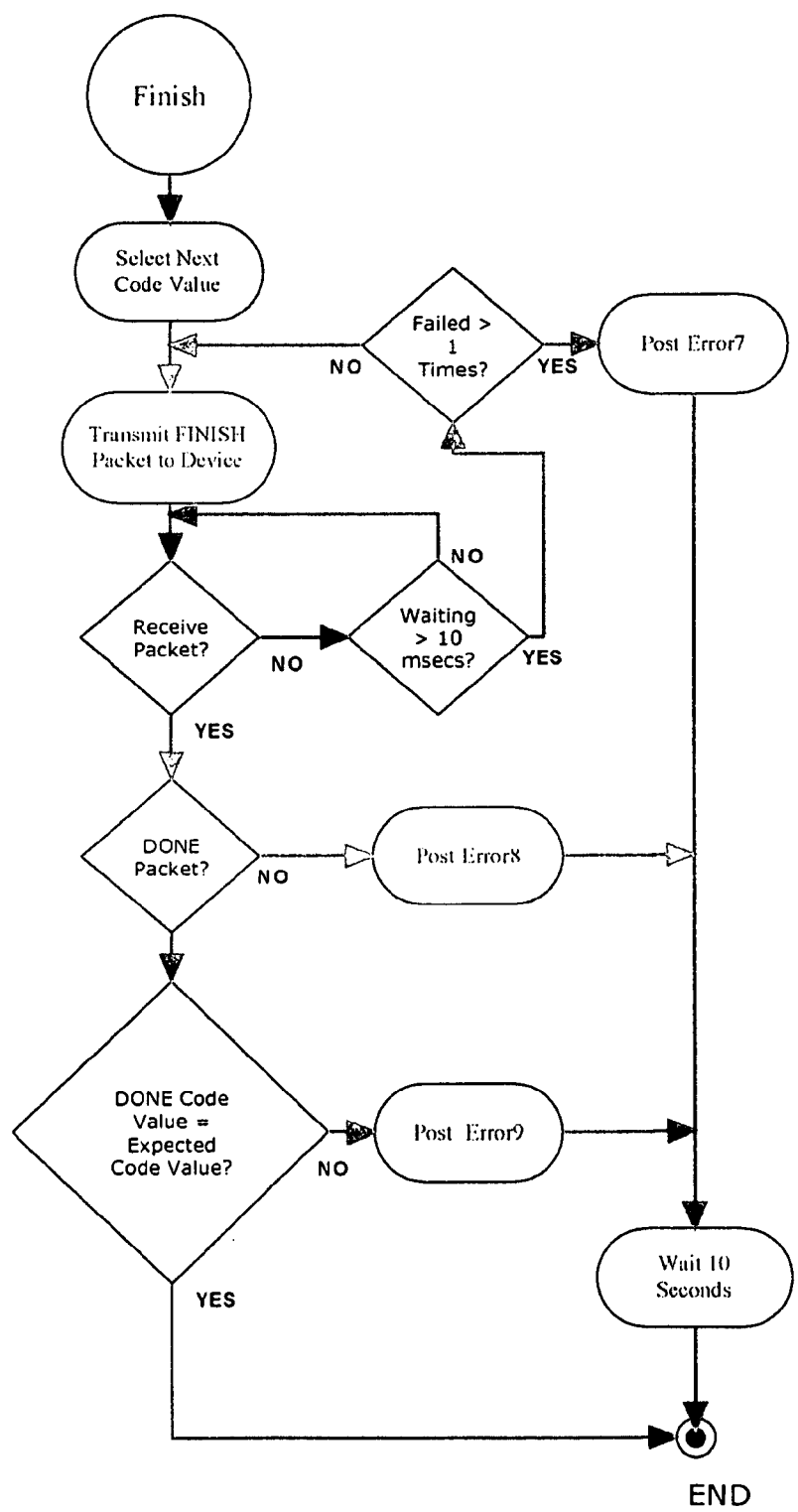

FIG. 9*c* illustrates a Finish sequence, corresponding to the situation where the host has no further communications with the haptic device required at the present time. The host determines a code value to embed in the next packet to the haptic device, and sends a FINISH packet, with that code embedded, to the haptic device. The host then waits to receive a packet from the device; if no packet is received within 10 milliseconds, and more than one failure has occurred, then the host posts Error7 and waits ten seconds before entering the END state. The 10 millisecond limit, and the limited number of allowed errors, can reduce the likelihood that the host communicates with a faulty haptic device, or communicates with a device over an unreliable communications channel (which could lead to unsafe behavior of the haptic device, for example if host commands required for safety were lost by the unreliable communications channel). If the device sends a packet but the packet is not a DONE packet, then the host posts Error8, and waits ten seconds before entering the END state. If the packet from the device is a DONE packet, but does not have the expected code embedded in it, then the host posts Error9 and waits ten seconds before entering the END state. In the example, the expected code is the next code in a sequence of codes, after the code sent by the host in the FINISH packet; in other embodiments the code can be another code as long as the host can determine whether the code returned from the haptic device corresponds to an expected code consistent with proper operation of the haptic device. A return of a packet other than a DONE packet, or a packet with an incorrect code embedded, can indicate an unreliable communications channel, or a device that is not operating as expected by the host; either situation could lead to unsafe operation of the haptic device as host commands are lost or misinterpreted.

The state chart in FIGS. 9(*a,b,c*) shows an example implementation of communications control on the host computer. The process shown in the state chart can be implemented on any computer system with any operating system and any programming language capable of accessing the appropriate haptic device communication channel.

As an example, the process shown in the state chart can be specifically implemented using the C++ programming language on a host computer running the Windows XP or Vista operating system. In an example embodiment suitable for use with a Novint Falcon haptic interface device, communications to the haptic interface device can be accomplished using USB 2.0 communication protocols and hardware. An appropriate USB driver package, such as the D2XX USB communication driver package provided by Future Technology Devices International Ltd is needed to open, utilize and close the USB 2.0 communication channel. The USB communication channel is opened when the host enters the START state shown in the state chart and closed when the host enters the END state shown in the state chart. Anywhere the state charts shows "Transmit", information is transmitted on the USB communication channel using the USB driver package. Information is, correspondingly received by the host computer anywhere where the state chart shows "Receive".

The process shown in the state chart detects communication protocol errors during communication/interaction with the haptic interface device. Depending on the protocol error highlighted by the communication process, the host computer will take different actions. After many errors are detected, the communication protocol inserts a wait (e.g., 10 seconds) before exiting. This wait can discourage unauthorized users from trying to reverse engineer the communications control protocol, for example, to defeat safety or security protocols. An explanation of the errors shown in the state chart and appropriate actions is found below.

Error1 occurs when the host computer is unable to establish communications with the haptic device, for example if the haptic device is not ready (e.g., has no power), or the haptic device does not correctly implement the communication protocol. When Error1 occurs, the host computer can notify the user, or a higher level software tool, of the error, and can attempt to establish communications with the haptic device again (e.g., automatically for some limited number of times such as 100, or automatically until directed to stop by the user or a higher level software tool, or as directed by the user or a higher level software tool). Error2, Error5, and Error8 occur when the host receives a packet of the wrong type from the haptic device, for example if the haptic device has failed in a may that causes it to violate the communications protocol. When Error2, Error5, or Error8 occurs, the host computer can notify the user or a higher level software tool of the error, and can terminate communications with the haptic device. Error3, Error6, and Error9 occur when the host computer receives a packet from the haptic device with the wrong code embedded in the packet, for example if the haptic device has failed in a manner that causes it to violate the communications protocol. When Error3, Error6, or Error9 occurs, the host computer can notify the user or a higher level software tool of the error, and can terminate communications with the haptic device. Error4 and Error7 occur when the haptic device fails to continue communications with the host computer, for example if the haptic device has lost power or has failed in a manner that causes it to violate the communications protocol. When Error4 or Error7 occurs, the host computer can notify the user or a higher level software tool of the error, and can terminate communications with the haptic device.

Example Implementation. The code sequence can be implemented, as one example, with a Mersenne Twister. See M. Matsumoto & T. Nishimura, "Mersenne twister: a 623-dimensionally equidistributed uniform pseudorandom number generator", ACM Trans. Model. Comput. Simul. 8, 3 (1998), incorporated herein by reference. Such a PRNG is based on a generalized feedback shift register algorithm. Its name is based on the fact that its period length is chosen to be a Mersenne prime. There are two common variations of the Mersenne Twister algorithm that differ only in the size of the Mersenne primes used. MT19937 is the 32-bit variant and MT19937-64 is the 64-bit variant. The Mersenne Twister algorithm is very commonly used and source code for it is freely available. For an example implementation, we can use the MT19937 (32-bit) variant. Matsumoto and Nishimura provide source code for MT19937 in the C programming language. See http://www.math.sci.hiroshima-u.ac.jp/~m-mat/MT/MT2002/CODES/mt19937ar.c, visited Jan. 30, 2008, incorporated herein by reference. We can use the init_genrand( ) function to seed the PRNG and the genrand_int32( ) function to generate our code sequences. An example of a communications session using such a code generator and using the state diagram implementations of the examples in FIGS. 8(a,b,c) and FIGS. 9(a,b,c) can illustrate the operation of an example embodiment of the present invention. An initial code value of 4E564E74 in hexadecimal notation can be selected, used as the seed value in init_genrand( ), and embedded in an INITIALIZE packet and a START packet sent from the host to the device. The same code value is embedded in a READY packet sent from the device to the host. The host then sends a COMMAND packet with the next code value, determined by the PNRG on the host to be 3BE88EA4 in hexadecimal notation. The device returns a STATUS packet, with the next code value, determined by the PNRG on the device to be FAEC0687 in hexadecimal notation. This can continue for additional COMMAND and STATUS packets, although, for brevity of illustration, only a single such set is described here. The host then sends a FINISH packet, with the next code value embedded, determined by the PNRG on the host to be A952970C in hexadecimal notation. The device responds with a DONE packet, having the next code value embedded, determined by the PNRG on the device to be 58C712E3 in hexadecimal notation. The packet type encodings used in this example can be those described above.

The particular sizes and equipment discussed above are cited merely to illustrate particular embodiments of the invention. It is contemplated that the use of the invention can involve components having different sizes and characteristics. It is intended that the scope of the invention be defined by the claims appended hereto.

We claim:

1. A method of communicating information from a host computer with a haptic device, comprising:
 a) Transmitting from the host computer to the haptic device an Initialize packet, where an Initialize packet comprises a sequence of bits having subsequences, in the following order:
  i) A subsequence indicating the start of a packet;
  ii) A subsequence identifying this packet as an Initialize packet;
  iii) A subsequence indicating a start code value for a sequence of code values;
  iv) A subsequence indicating a message;
  v) A subsequence indicating the end of a packet;
 b) After transmitting the Initialize packet, then transmitting from the host computer to the haptic device a Start packet, where a Start packet comprises a sequence of bits having subsequences, in the following order:
  i) A subsequence indicating the start of a packet;
  ii) A subsequence identifying this packet as a Start packet;
  iii) A subsequence indicating the start code value;
  iv) A subsequence indicating a message;
  v) A subsequence indicating the end of a packet;
 c) After a packet has been received from the haptic device at the host computer after the transmission of the Start packet, then transmitting from the host computer to the haptic device a first Command packet; where a Command packet comprises a sequence of bits having subsequences, in the following order:

i) A subsequence indicating the start of a packet;
    ii) A subsequence identifying this packet as a Command packet;
    iii) A subsequence indicating the code value in the sequence of code values having a predetermined relationship to the code value in the previous packet transmitted from the host computer to the haptic device;
    iv) A subsequence indicating a message;
    v) A subsequence indicating the end of a packet;
  d) After a packet has been received at the host computer after the transmission of the preceding Command packet, then transmitting from the host computer to the haptic device a subsequent Command packet.

2. A method as in claim 1, wherein the sequence of code values is a sequence of pseudorandom numbers determined using the start code value as the seed for a pseudorandom number generation method.

3. A method as in claim 2, wherein the pseudorandom number generation method comprises one or more of the Mersene Twister method, the Yarrow method; a Linear Congruential Generator; a pseudorandom number generator using a Linear Feedback Shift Register; and a multiply-with-carry method.

4. A method as in claim 1, further comprising repeating step d one or more times.

5. A method as in claim 1, further comprising determining if the host computer receives a packet from the haptic device that does not contain a valid code value, and, if so, causing the host computer to enter an error state.

6. A method as in claim 5, wherein causing the host computer to enter an error state comprises communicating an error to at least one of (a) a user of the host computer, and (b) a supervisory or error management program on the host computer; and communicating to the haptic device commands to enter a Safe mode.

7. A method as in claim 1, wherein the host computer transmits packets at a rate of at least 10 per second.

8. A method as in claim 7, wherein the host computer transmits packets at a rate of at least 50 per second.

9. A method as in claim 1, wherein the code value in the Command packet is the ith code value in the sequence, and the code value in the next Command packet is the (i+2)th code value in the sequence.

10. A method as in claim 1, further comprising determining whether a packet received in response to a Command packet has a code value in the sequence of values immediately after the code value in the Command packet.

11. A method as in claim 1, further comprising determining whether a packet received in response to the Start packet has the code value in the Start packet.

12. A method as in claim 1, further comprising determining the first Command packet in part from information in the packet received in response to the Start packet.

13. A computer-readable medium having thereon instructions for causing a computer to communicate with a haptic device according to claim 1.

14. A method as in claim 1, wherein:
  a) The subsequence of bits identifying a packet as an Initialize packet is 64 bits in length;
  b) The subsequence of bits identifying a packet as a Start packet is 64 bits in length;
  c) The subsequence of bits identifying a packet as a Command packet is 64 bits in length;
  d) A method as in claim 1 wherein the code values are 64 bits in length.

15. A method as in claim 1, wherein a subsequence identifying a packet as an Initialize packet is the same as a subsequence identifying a packet as a Start packet.

16. A method as in claim 14, wherein
  a) The subsequence of bits identifying a packet as an Initialize packet is 4E 77 6D 6C 6C 6C 6F 4D in hexadecimal notation;
  b) The subsequence of bits identifying a packet as a Start packet is 4E 77 6D 6C 6C 6C 6F 4D in hexadecimal notation;
  c) The subsequence of bits identifying a packet as a Command packet is 61 43 4F 6D 6D 41 4E 44 in hexadecimal notation.

* * * * *